US006952419B1

(12) United States Patent
Cassiday et al.

(10) Patent No.: US 6,952,419 B1
(45) Date of Patent: Oct. 4, 2005

(54) HIGH PERFORMANCE TRANSMISSION LINK AND INTERCONNECT

(75) Inventors: Daniel R. Cassiday, Topsfield, MA (US); David L. Satterfield, Tewksbury, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 839 days.

(21) Appl. No.: 09/697,730

(22) Filed: Oct. 25, 2000

(51) Int. Cl.[7] .................... H04L 12/56
(52) U.S. Cl. .................... 370/392; 370/395.3; 370/419
(58) Field of Search .................... 370/359–360, 370/363, 392, 395.3, 395.42, 395.43, 412–420, 429, 465, 219–220; 340/825.79–825.89

(56) References Cited

U.S. PATENT DOCUMENTS

| | | | | |
|---|---|---|---|---|
| 5,084,867 A | | 1/1992 | Tachibana et al. | |
| 5,436,886 A | * | 7/1995 | McGill | 370/219 |
| 5,488,606 A | * | 1/1996 | Kakuma et al. | 370/219 |
| 5,517,495 A | * | 5/1996 | Lund et al. | 370/399 |
| 5,600,630 A | | 2/1997 | Takano et al. | |
| 5,675,736 A | | 10/1997 | Brady et al. | |
| 5,712,854 A | * | 1/1998 | Dieudonne et al. | 370/536 |
| 5,790,522 A | * | 8/1998 | Fichou et al. | 370/236 |
| 5,802,258 A | | 9/1998 | Chen | |
| 5,841,989 A | | 11/1998 | James et al. | |
| 5,867,663 A | * | 2/1999 | McClure et al. | 709/234 |
| 5,905,714 A | | 5/1999 | Havansi | |
| 5,926,456 A | | 7/1999 | Takano et al. | |
| 5,982,771 A | * | 11/1999 | Caldara et al. | 370/389 |
| 6,069,893 A | * | 5/2000 | Parruck et al. | 370/395.42 |
| 6,072,772 A | * | 6/2000 | Charny et al. | 370/229 |
| 6,205,117 B1 | | 3/2001 | Doshi et al. | |
| 6,359,861 B1 | * | 3/2002 | Sui et al. | 370/230 |
| 6,567,900 B1 | * | 5/2003 | Kessler | 711/157 |
| 6,597,691 B1 | * | 7/2003 | Anderson et al. | 370/360 |
| 6,625,160 B1 | * | 9/2003 | Suzuki | 370/413 |
| 2001/0050916 A1 | * | 12/2001 | Krishna et al. | 370/419 |

* cited by examiner

*Primary Examiner*—Hassan Kizou
*Assistant Examiner*—Gregory Sefcheck
(74) *Attorney, Agent, or Firm*—Meyertons Hood Kivlin Kowert & Goetzel, P.C.; Stephen J. Curran

(57) ABSTRACT

Methods and components in an interconnect system for improving the performance of the system with respect to increasing bandwidth in a serial link, increasing the processing speed of a packet in a node, and improving the calibration of links in the system are described. In one aspect of the present invention, a method of encoding framing data in a packet such that less than the normal number of framing bits is required. For example, a flit, the data unit sent over a serial link in one clock cycle, can be 88 bits in length, and a packet can be made up of one, two, or four flits. If the packet is a one- flit packet, two framing bits are inserted into the packet. If the packet is two flits, four framing bits are inserted into the packet, and if it is a four-flit packet, eight framing bits are inserted. In this way, space in the packet for data is maximized and the total number of bits of the packet can be determined either after reading a first framing bit if the packet is one flit or after reading a second framing bit if the packet is two or four flits long.

15 Claims, 13 Drawing Sheets

HIGH PERFORMANCE TRANSMISSION LINK AND INTERCONNECT

CROSS-REFERENCE TO RELATED APPLICATIONS

The present application is related to U.S. patent application Ser. No. 09/697,663, filed on Oct. 25, 2000, entitled, "AUTOMATIC LINK FAILOVER IN DATA NETWORKS", which is incorporated herein by reference.

BACKGROUND OF THE INVENTION

1. Field of The Invention

The present invention relates generally to data communication networks and the transmission of data in those networks and the transmission of data in the networks. More specifically, it relates to hardware and data encoding modifications for increasing the throughput and and error discrimination properties of data networks and decreasing the latency of data networks.

2. Discussion of Related Art

As the use of data communication networks becomes increasingly widespread, the need for reliable data transmission through nodes in such networks, the Internet being one example, has become more important. In addition, the standards for what is acceptable data transmission and what actions should be taken when there is a failure in a network link have also been rising. In some network protocols, the tolerance for transmission errors is decreasing and it is required that any disruptions in nodes in the network be transparent to the high-level clients and other nodes. Data should reach destination nodes without errors and in order. Any failures and resulting failover actions taken by the network should be transparent to upper-level clients.

Presently, the interconnect links in most data networks are not sufficiently reliable to ensure that data reach destinations without errors and in proper order, and that failover actions be transparent to other nodes and users. One reason for this is that many failover schemes are implemented primarily at a software level. That is, processes implemented in software detect a problem or failure and send the data using an alternative route. These software solutions fall short of the requirements for complete, error-free, fast, and in-order data transmission. In addition, protocols such as SSM (scalable, shared memory), require that data packets be delivered to their destinations despite link failures and that the state of the network be recoverable. Presently, there are no hardware or software solutions that meet these requirements.

The overall efficiency of data networks is also becoming increasingly important. As the amount and types of data being sent over networks grows and becomes more complex, it is essential that data packets and administrative packets carry as much useful information as possible. For example, with respect to coding and framing of data packets, both of which can consume significant bandwidth in a link. Framing is necessary since it is important to have a method of quickly identifying the boundaries of data packets in the event packets are lost during transit. Coding must maintain DC balance. Given that the size of data packets can be as large as four flits (four 88-bit data units), it is important to maintain consistency when encoding a packet, such as CRC encoding, and to have certain bits in the same locations. In addition, it is important that network links be calibrated efficiently and that round-trip times between nodes be measured accurately. This is desirable since a transmitter will keep sending a packet until it receives an acknowledgement that the packet has been received. If the transmitter waits longer than it needs to before re-sending the packet because the packet is lost, and bandwidth is being wasted.

Therefore, an accurate measure or wait time for a round-trip between two nodes is desirable. The management of links is also imporant in keeping the network efficient. It would be desirable to do this at a low-level where upper-level clients can send data across a link without having to use a high-level protocol and before the links are up and running. It would also be desirable to perform fast synchronizations using broadcast messages. However, to prevent lock-ups from occurring, the broadcast message can be turned off according to a protocol that will guarantee the interconnects will not lock up. A global synchronization mechanism between nodes to send messages to nodes when needed would be desirable.

SUMMARY OF THE INVENTION

The present invention describes methods and components in an interconnect system for improving the performance of the system with respect to increasing bandwidth in a serial link, increasing the processing speed of a packet in a node, and improving the calibration of links in the system. In one aspect of the present invention, a method of encoding framing data in a packet is described. A packet is a data unit having a specific number of flits, a flit, in turn, having a specific number of bits. For example, a flit, the data unit sent over a serial link in one clock cycle, can be 88 bits in length, and a packet can be made up of one, two, or four flits. If the packet is one flit, two framing bits are inserted into the packet. If the packet is two flits, four framing bits are inserted into the packet, and if it is a four-flit packet, eight framing bits are inserted. In this way, space in the packet for data is maximized and the total number of bits of the packet can be determined either after reading a first framing bit if the packet is one flit or after reading a second framing bit if the packet is two or four flits long.

In one embodiment, the framing bits are placed in bit positions 85 and 87 of the packet. For a one flit packet, a framing bit of zero is in position 87 and a one is in position 85. For a two flit packet a one is inserted in bit position 87 and a zero in bit position 85 for the first flit and a zero in bit position 87 and a one in bit position 85 for the second flit For a four flit packet, a one is inserted in bit position 87 and a one in bit position 85 in the first flit, a one in bit position 87 and a zero in bit position 85 in the second flit, a zero in bit position 87 and a zero in bit position 85 in the third flit, and a zero in bit position 87 and a one in bit position 85 in the fourth flit. In another embodiment, a framing bit sequence of zero followed by one indicates the end of a packet or the beginning of a one-flit packet and a framing bit sequence of one followed by zero followed by zero followed by one indicates a two-flit packet.

In another aspect of the present invention, a method of calibrating a link between two nodes is described. A near-end node sends to a far-end node a packet having a user field in which an initial counter value is stored. A second counter or clock continues to increment with the passage of time at the near-end node. The far-end node immediately returns the initial counter value to the near-end node unaffected. The near-end node then compares or performs some functions on the initial counter and the second counter values. The link between the nodes is calibrated according to these values. In one embodiment, the difference between the two values is used as a round-trip time for the link and is used to determine when to re-transmit a data packet because the acknowledgment of the receipt of the first data packet was not received.

In another aspect of the present invention, a node in an interconnect system is described. A receiver in the node has two buffers. When the receiver gets a data segment, such as 8 bits of a flit, it examines a particular bit and determines, based on the bit, whether the data segment should go to a first buffer or a second buffer. For example, if the bit is a one, it will go to the first buffer and if it is a zero it will go to the second buffer. The node also has a dual crossbar, one for each buffer. A first crossbar receiving data segments from one buffer and the second crossbar receives data segments from the other buffer. This allows the potential routing of two data segments in one clock cycle to their respective transmitters so that one segment does not have to wait for the other segment to be routed.

In another aspect of the present invention, a method of routing a received data packet through a node is described. A data packet is received at a receiver in the node. The packet is examined based on one or more categorical bits in the data packet, such as a stripe bit. The data packet is then sorted based on the categorical bits and sent to one of multiple buffers. The packet is then inputted to a crossbar that corresponds to the buffer from which the packet came. The packet is then routed to a transmitter such that tow data packets can be processed by the node in one clock cycle. In one embodiment, the order of sequential data packets passing through one of the buffers and crossbars is maintained so that packets that belong together and have a certain order are one of the plurality of buffers.

BRIEF DESCRIPTION OF THE DRAWINGS

The invention will be better understood by reference to the following description taken in conjunction with the accompanying drawings in which.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A system and method for optimizing the performance of an interconnect system is described in the various figures. Also described is a system and method for automatic link failover in data networks are described in the various figures. Automatic link failover enables data packet traffic scheduled to go over a particular link to be dynamically re-routed to an alternative path if the particular link should fail. Automatic link failover of the present invention can be used to reduce system failure rates from single optical link failures and allow for uninterrupted operation when a link fails. Automatic link failover is described first. The various optimizations and network management techniques for improving the performance of a data network are described after the automatic link failover.

As will be described in greater detail below, when link failover is enabled and the transmission error rate on a link becomes excessive, the link goes into failover mode according to the present invention. The link is shut down and any data packets scheduled to use the link is redirected to a failover path for that link. There is a failover path defined for each potential link failure. This failover path has a certain number of "hops." Failover path routing is similar to normal packet routing except separate failover route tables are used to determine the failover path. Failover packets (FOPs) only share links with normal packet traffic as FOPs multihop along a failover path. These failover packets can be seen as using a separate virtual channel. That is, except for a shared link, they do not share any other hardware resources with normal packet traffic. In addition, when a link goes into failover mode, the failover relies on a retransmission protocol that already exists. This guarantees that the packet stream will continue to be delivered reliably in spite of a link failure.

Figure 1:
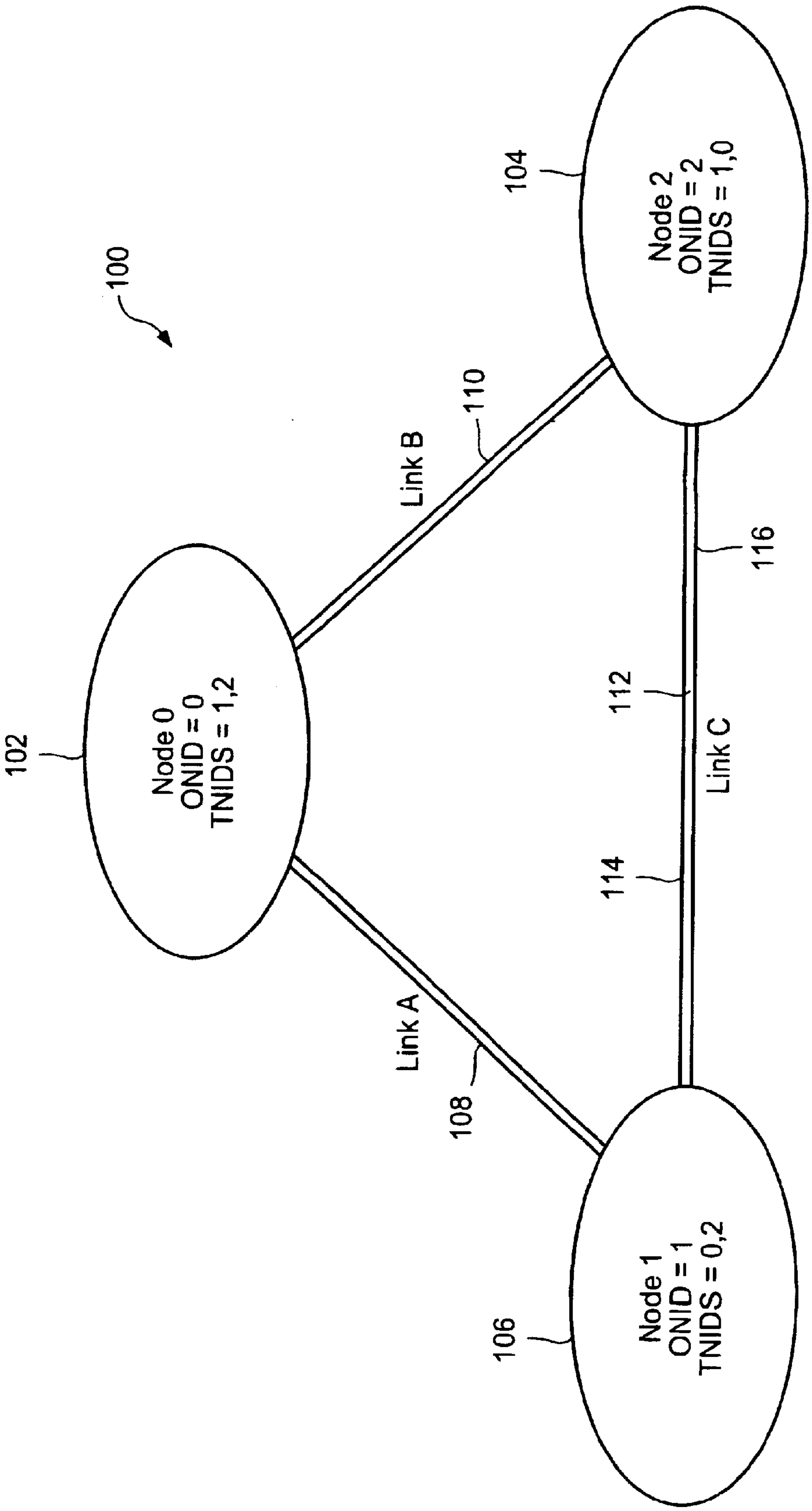
FIG. 1 is a logical block diagram of a data network having three nodes and three links used to illustrate one embodiment of the present invention.

FIG. 1 is a logical block diagram of a data network having three nodes and three links used to illustrate one embodiment of the present invention. Network 100 has three nodes, node 102, node 104, and node 106, and three interconnect links, link 108, link 110, and link 112. For ease of reference, in the description below, these nodes and links will also be referred to as follows: node 102=Node 0, node 106=Node 1, node 104=Node 2, link 108=Link A, link 110=Link B, and link 112=Link C.

Each node is both an end-node (e.g., a server) and a switch. A node has an identifier referred to as an ONID. For example, the ONIDs for Nodes 0, 1, and 2 can be 0, 1, and 2, respectively. A link is a bidirectional path implemented using two unidirectional physical segments shown, for example, as lines 114 and 116 for Link C. The number of links each node can have depends on the limitations of the particular data network. A typical number of nodes that can be connected to a single node is fifteen. For each node connected to a particular node, there exists a TNID in the particular node. For example, in network 100, Node 1 has two TNIDs, 0 and 2, corresponding to Node 0 and Node 2. As is known to one skilled in the field of data networks, each interconnect or link in a node has a receiver and a transmitter. Thus, each node in network 100 has two receiver/transmitter pairs. Of course, network 100 is a simplified version of a typical network, which can have a higher number of nodes and interconnects. A node modified to handle realtime, automatic link failover of the present invention is described in greater detail in FIG. 2. It is useful to mention here that there are at least two paths that can be used to go from one node, or an originator node, to a destination node: a shorter, primary path (e.g., Link A between Nodes 0 and 1) and a longer, secondary path (e.g., Links B and C via Node 2).

Figure 2:
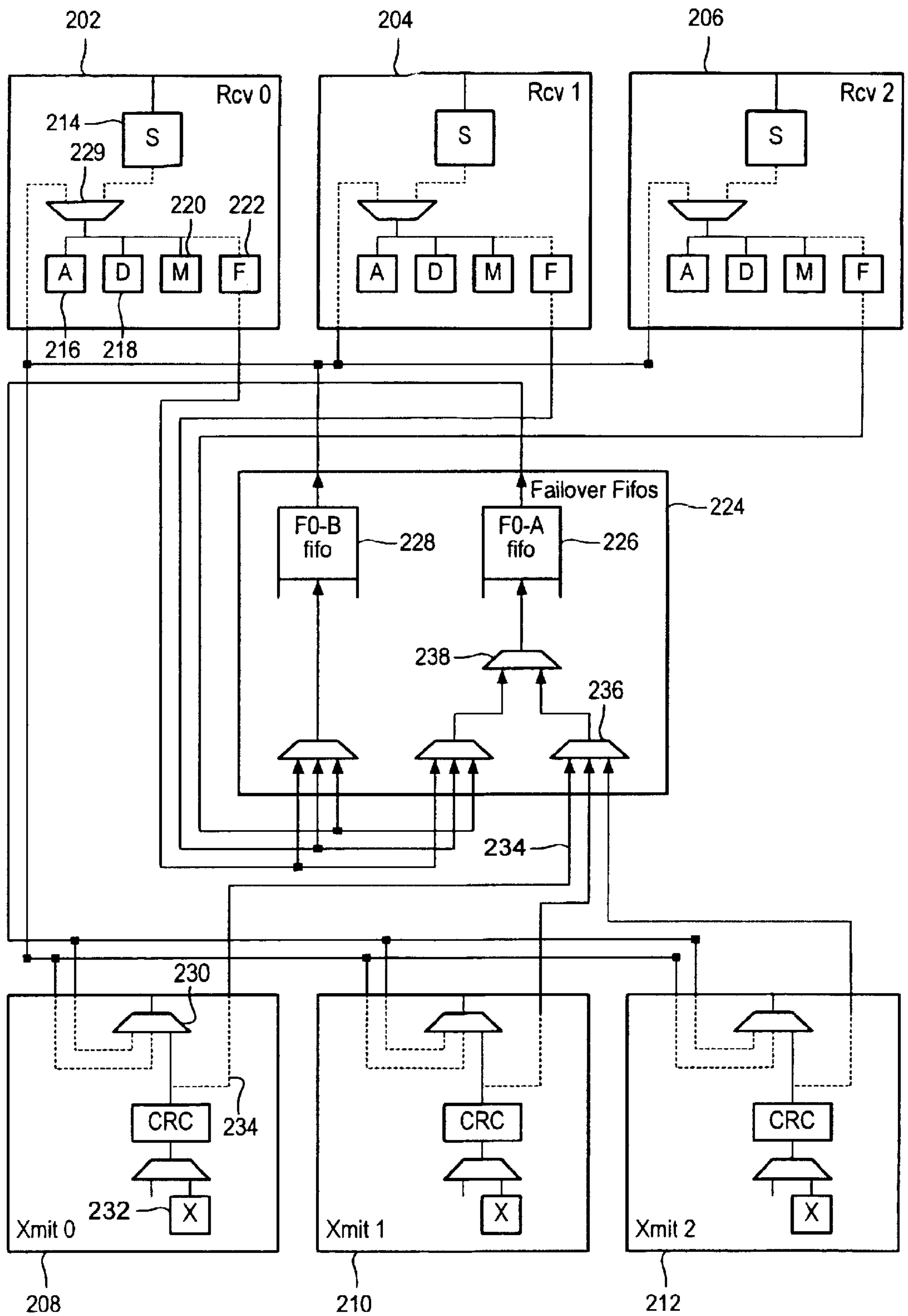
FIG. 2 is a schematic diagram showing components and logic enabling a node to process failover packets in accordance with one embodiment of the present invention.

FIG. 2 is a schematic diagram showing components and logic enabling a node to process failover packets in accordance with one embodiment of the present invention. It shows in greater detail any of Nodes 0, 1, and 2 with the one difference that the node of FIG. 2 has three links instead of two. The node components shown in FIG. 2 include three Rev/Xmit pairs, i.e., three links (unlike the nodes shown in FIG. I which have two links). However, the concepts and components of the present invention are the same regardless of the number of links in each node (or the number of nodes in a network).

Three receivers, 202 (Rcv 0), 204 (Rcv 1), and 206 (Rcv 2), and three transmitters, 208 (Xmit 0), 210 (Xmit 1), and 212 (Xmit 2) are shown. As is known in the field, each receiver has a synchronize buffer S, one of which is represented by box 214. Sync buffer S brings data to a local clock domain on the switch or node from the remote clock domain on the link from which a data packet is being received.

Under normal conditions, once a packet is received it can go to either an address buffer 216 (if an address packet), a data buffer 218 (if a data packet), or to a multihop buffer 220 (if the packet is hopping to another node via another link). Multihop buffer 220 feeds a cross-bar which sends the in-transit packet to a transmitter where it sits in a buffer before being sent out. In another preferred embodiment, some or all of these buffers can be combined in a single local buffer.

A fourth buffer referred to as a failover buffer 222 stores failover packets (FOPs) that get routed to a component of the node that can be referred to as a shared resource 224 in the node. In the described embodiment, shared resource 224 has two storage components: first-in, first-out (FIFO) stack A, 226, and FIFO stack B, 228. FIFO A gets packets from receivers and transmitters but feeds only transmitters. FIFO B gets packets from only receivers but feeds both receivers and transmitters. Another component of shared resource 224 is a pair of failover routing tables not shown in FIG. 2. Further details of failover buffer 222 and shared resource 224 are described below. Each receiver also contains a multiplexer 229 which receives packets from the sync buffer or from shared resource 224 and directs packets to one of the four buffers.

In each transmitter there is an arbitrator that works or instructs a mux, such as mux 230 in transmitter 208, whether the link for that transmitter will be used to transmit a normal packet or an FOP brought in via shared resource 224, originally from the buffer of a transmitter whose link has failed. That is, mux 230 and its associated selection control logic (the combination of these two components make up the arbitrator) is needed if the transmitter will be getting FOPs from another transmitter. Otherwise, if it was receiving only normal data packets it would not be needed. It is helpful to note here that in the described embodiment, a packet waiting in a transmitter buffer, such as in box 232 for a link that fails is re-routed to another link but is not stored in the buffer for the transmitter for that alternative link. As will be described in greater detail below, a normal packet is modified to be an FOP and only shares the interconnect link, but no other hardware resources of the alternative transmitter. Thus, a virtual channel is created for the FOP. The numerous connection paths and connectors in FIG. 2 are described in relation to the figures and flow diagrams below. Briefly, they show how data is routed among the failover buffers in the receivers, FIFOs A and B, and the transmitters.

Figure 3A:
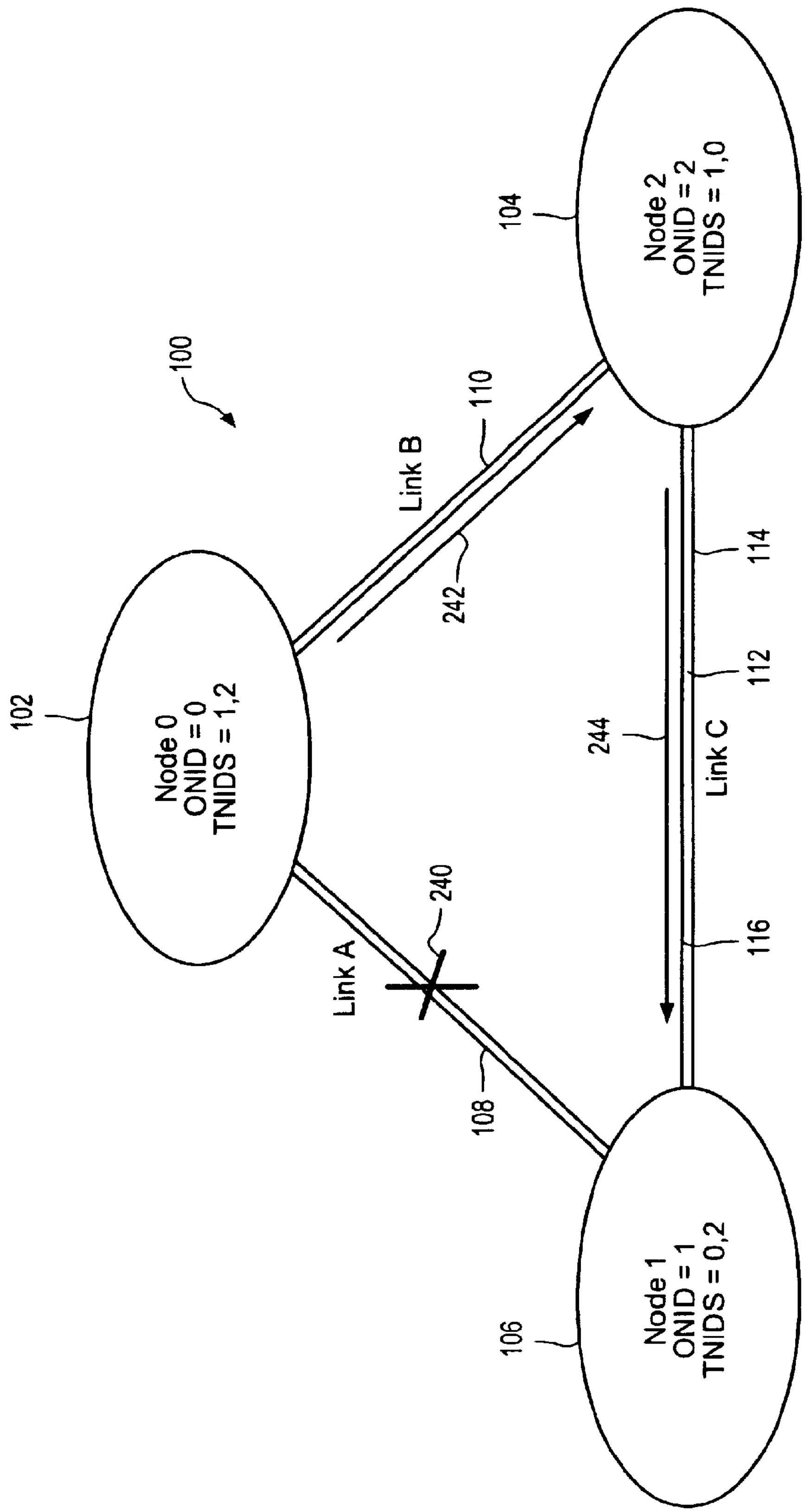
FIG. 3A is a logical block diagram of a data network showing a failed link and an alternative path for routing a failover data packet to a destination node in accordance with one embodiment of the present invention.

FIG. 3A is a logical block diagram of a data network showing a failed link and an alternative path for routing a failover data packet to a destination node in accordance with one embodiment of the present invention. It is similar to FIG. 1 except that it shows a failed link, Link A, between Node 0 and Node 1. It also shows an alternative path a failover data packet can take to get from Node 0 (origination node) to Node 1 (destination or target node) via Node 2 (a multihop node) using Links B and C. This figure illustrates an example used to describe one embodiment of a failover process shown in FIGS. 3B to 8 below.

Figure 3B:
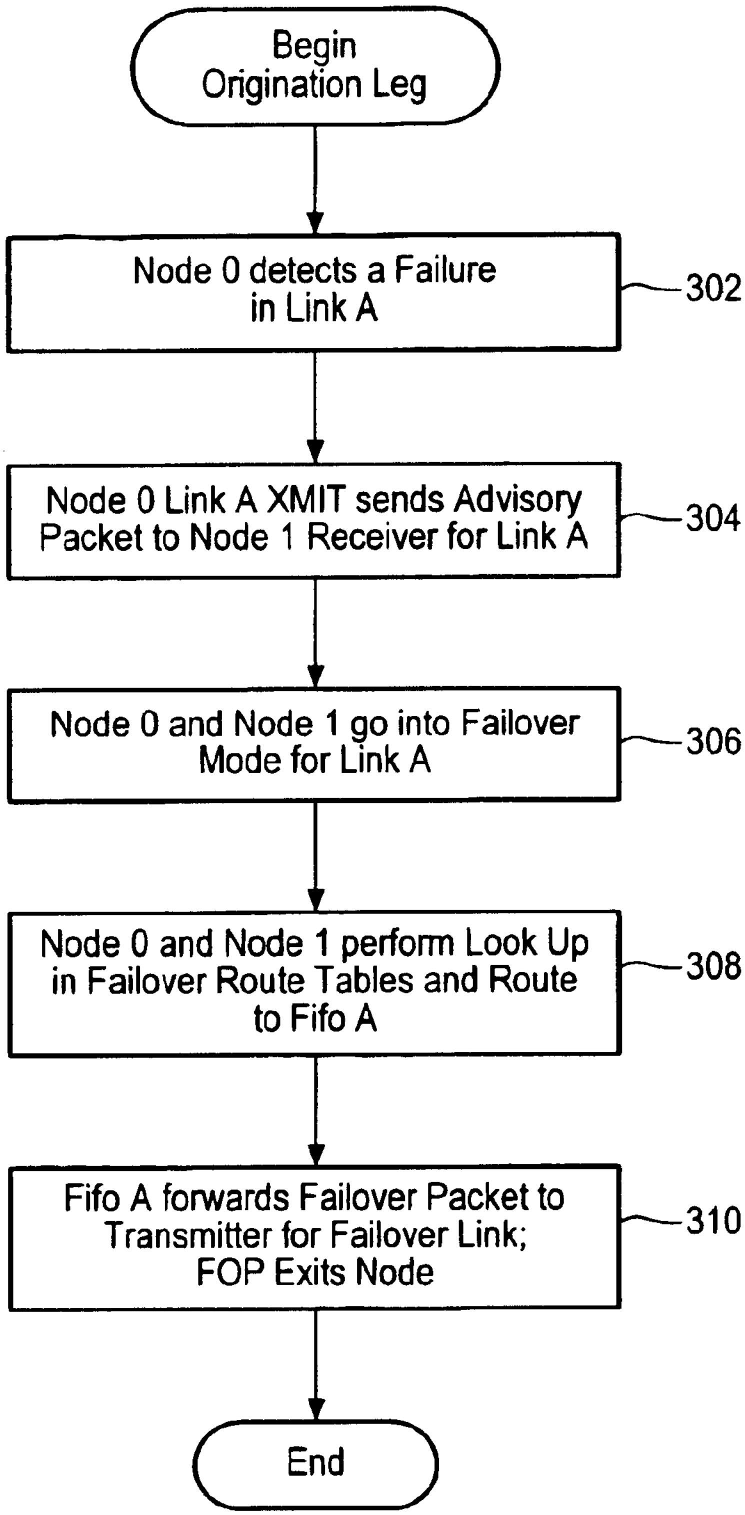
FIG. 3B is a flow diagram of an origination leg of an alternative path of a failover packet in a data network in accordance with one embodiment of the present invention.

FIG. 3B is a flow diagram of an origination leg of an alternative path of a failover packet in a data network in accordance with one embodiment of the present invention. The nodes and links referred to in this and subsequent flow diagrams are those shown in FIG. 1, i.e., Nodes 0, 1, and 2, and Links A, B, and C. For the purposes of illustrating the described embodiment, the following scenario will be used: Node 0 wants to send a normal data packet to Node 1 using Link A. As such, the data packet is presently in the transmitter for Link A in Node 0 scheduled to be sent to the receiver for Link A in Node 1 when a failure occurs in Link A.

At step 302 Node 0 detects a failure in Link A. As is known in the field, this can be done by examining the transmission error rate on a link and comparing it to a threshold number of errors. As mentioned above, a link is a bidirectional path implemented using two unidirectional physical segments. When one of the segments fails, both segments on the bidirectional link go into failover mode. One end (referred to as the near-end) experiences an excessive transmission error rate causing it to enter failover mode. In this example, the near-end is Node 0 and, specifically, the transmitter for Link A. The near-end will attempt to signal the far-end of this, using an administrative packet sent on an oppositely-directed link (i e., the link that is connected to the transmitter associated with the receiver) before shutdown, where the administrative packet has an in_failover bit or an equivalent bit set. The far-end is the receiver for Link A in Node 1. This is shown at step 304. If the far-end receives this failover notification, it will also go into failover mode. The far-end receiver may not receive this advisory packet because the link may not be reliable (administration packets do not have retransmission features). If not, the ensuing transmission errors resulting from the near-end link shutdown (i.e., Node 0 turns off its clock) will cause the far-end to go into failover mode. More specifically, in certain networks, after sending 16 administrative packets with an in_failover bit set, the hardware in Node 0 will turn off the link clock on the failed segment. This process insures that an administrative packet will have been sent with an in_failover bit set on the failed link. If this packet is not received by the far-end, the far-end (i.e., Node 1) will enter failover mode due to clocking errors it detects as a result of the clock being turned off.

At step 306 Link A components for Node 0 and Node 1 go into failover mode. Failover mode is enabled by having a failover_en field set in the control status register for a particular link. Failover mode can only be entered when 1) the failover_en bit in the CSR is set on a given link, 2) that link is in an IN_USE state, and 3) the failover_en bit in a configuration register is set. This allows failover packets to be routed by links that are forwarding failover traffic. The link_state will go into FAILOVER when the conditions described in steps 302 and 304 occur.

At step 308 the normal data packet is converted to a failover data packet at the transmitter. Also performed at step 308 is a lookup in the failover route tables by the transmitter and an alternative link is selected. At this stage, the nodes insert into an outlink field in the data packets which alternative transmitter/link will be acting in place of the normal transmitter. Thus, a data packet at Node 0 scheduled to use Link A will have a value indicating the transmitter for Link A in its outlink field. As will be described below, a node uses its failover routing tables to determine which alternative link will be used and, thus, what replacement value will go in the outlink field. By doing so, the normal packet is converted to an FOP. This process is shown in greater detail below. Node 0 and Node 1 transmitters for Link A route data packets in its buffers to FIFO A. This is shown by connection line 234 for Xmit 208 shown in FIG. 2. Before entering FIFO A, the data packets go through mux 236 and mux 238 in shared resource 224.

In the described embodiment, failover is supported by having two additional fields in each packet. One field is for holding an ONID value which is a node identifier from which a failover packet is originating. The ONID value is used by a receiving node to verify that a failover packet arrived from an expected originating node. The receiver checks that the ONID in the packet matches a TNID value for that link. The other field is for holding a TNID value which is a node identifier for the far-end or receiving node of a link. This field is used to route failover packets to the far-end of the link when the link enters failover mode. In sum, when a link in a node enters failover mode, packet transmission for this link continues as before for both data and address packets except that these packets are sent to FIFO A logic. The status information (i.e., expected sequence number, etc.) that is normally sent out with a normal packet is included as well as the sequence number of the original packet The packet is modified to mark it as a failover packet by setting a failover_pkt bit. The CRC is then calculated (based on the modified packet) and attached. The ONID is embedded into this CRC in the same manner as sequence numbers are embedded. This is used to uniquely mark the originator of the failover packet. As will be seen, the termination node will need this information in accepting the packet.

At step 310 FIFO A forwards the FOP to the selected transmitter for transmission over the failover link at which point the FOP leaves the node. Referring to the example in FIG. 1, Link B will be used to get the FOP out of Node 0. As mentioned, mux 230, along with selection control logic, acts as an arbitrator and decides when the FOP will have access and get to share the link since normal packets in the buffer for Link B will be using the link as well. In the described embodiment, arbitration is done on a last-won round-robin basis between normal and failover packets. Note that FIFO A in Node 0 and Node 1 is receiving packets from transmitters (for failed links) and sending packets to transmitters (for alternative links).

Figure 4:
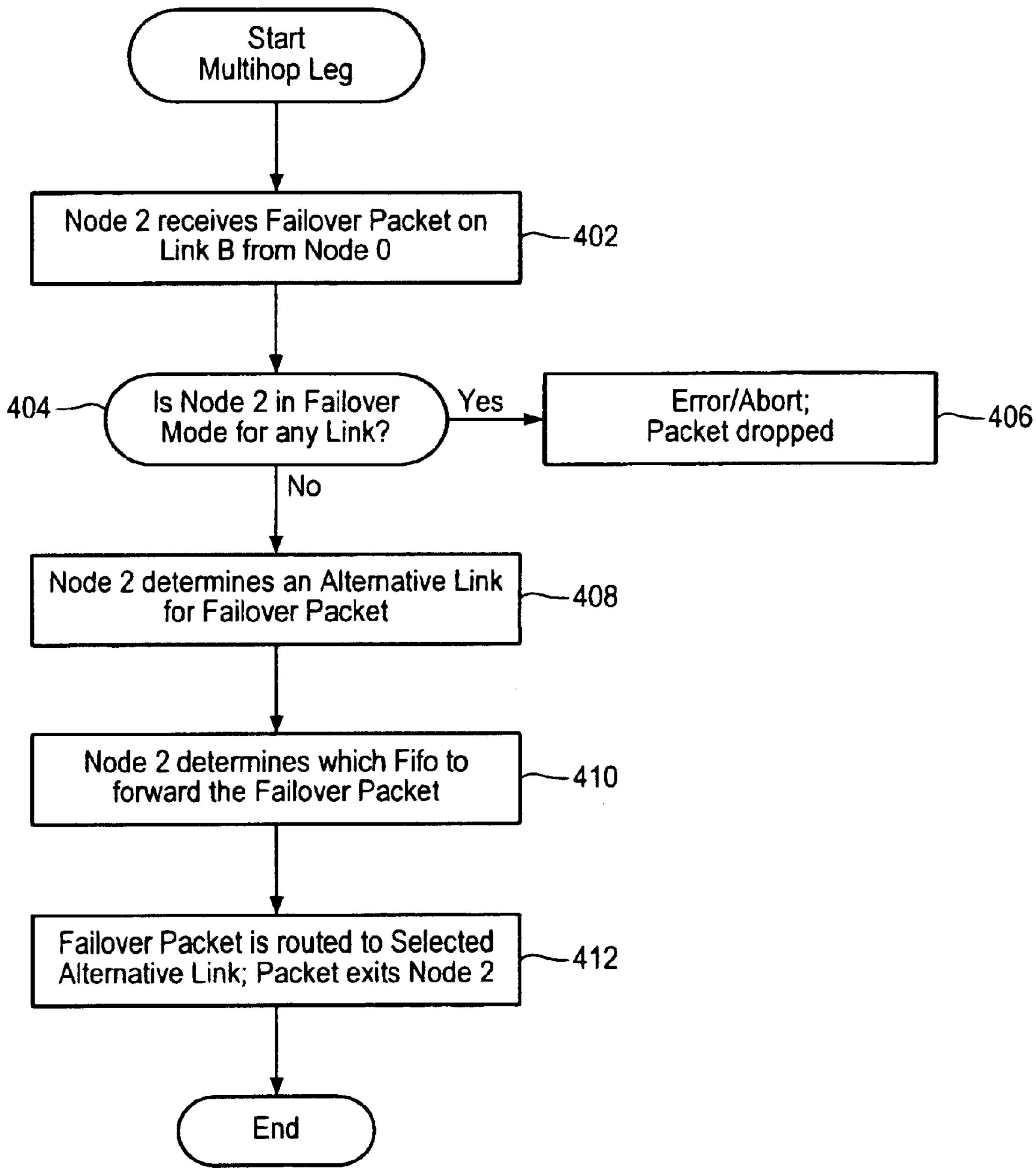
FIG. 4 is a flow diagram of a process for hopping packets in a failover path in accordance with one embodiment of the present invention.

FIG. 4 is a flow diagram of a process for hopping packets in a failover path in accordance with one embodiment of the present invention. A multihop occurs when a node forwards failover traffic. For a node to be a multihop leg the node can not have any of its own links already in failover mode. At step 402 the failover packet is received at the multihop node. In the example, this is Node 2 receiver for Link B. When it reaches the receiver, it goes through the synchronize buffer. When it reaches the head of the sync buffer, receiver logic detects it is a failover packet by checking the failover_pkt bit placed in the packet If link failover is enabled for forwarding failover packets (ie., a particular bit, such as failover_en, is set), the packet is sent to the failover logic (essentially, shared resource 224 of FIG.2 ) if it contains no detected transmission, framing, or routing errors. No status information is extracted and a multihop failover packet is not modified on a multihop leg (neither packet contents nor its CRC is changed).

At step 404 the node determines whether it is already in failover mode for any of its links. If it is, in the described embodiment, the failover process is finished and an error/abort condition arises and the packet is dropped at step 406. In another preferred embodiment, a fill crossbar for failover (as oppposed to the two shared failover FIFOs), would allow for simultaneous failover of multiple links. If not, the process continues with step 408 where the node decides which transmitter/link to forward the FOP. As in step 308, the node uses its failover routing tables to make this determination. At this time, the node, such as Node 2 checks whether the target destination for the failover packet (Node 1) is the current node. This can be done by comparing the TNID of the packet to a node_id field in a CSR in the node. If the target node and the current node are the same, the packet has reached its destination leg. A process for handling the packet at a destination node is described in FIG. 5. However, if the target node and the current node are not the same, the processing continues and the packet is routed to the correct outgoing link.

Unlike with the originate leg where the packet was being sent from one Xmit to an alternative Xmit, the packet is not sent directly to FIFO A. In this case, the node determines, using one or more rules, to which FIFO the packet will be sent at step 410. These rules may be set arbitrarily but must be consistently applied. One such possible rule and the one used in the described embodiment is as follows: place the packet in FIFO A if the incoming port number is lower than the outgoing port number and in FIFO B if it is higher. As long as the rules are applied in the same manner for all packets, other values and logic can be used.

Once the packet has made its way through the failover logic and is in one of the FIFOS, the packet is routed to the selected alternative transmitter and sent out on the selected link at step 412. As described in FIG. 3, once the packet reaches the transmitter, it arbitrates for use of the link along with packets that normally use that link. Any appropriate method or rules, such as last-won round-robin, can be used to decide which packet will next use the physical link.

Figure 5:
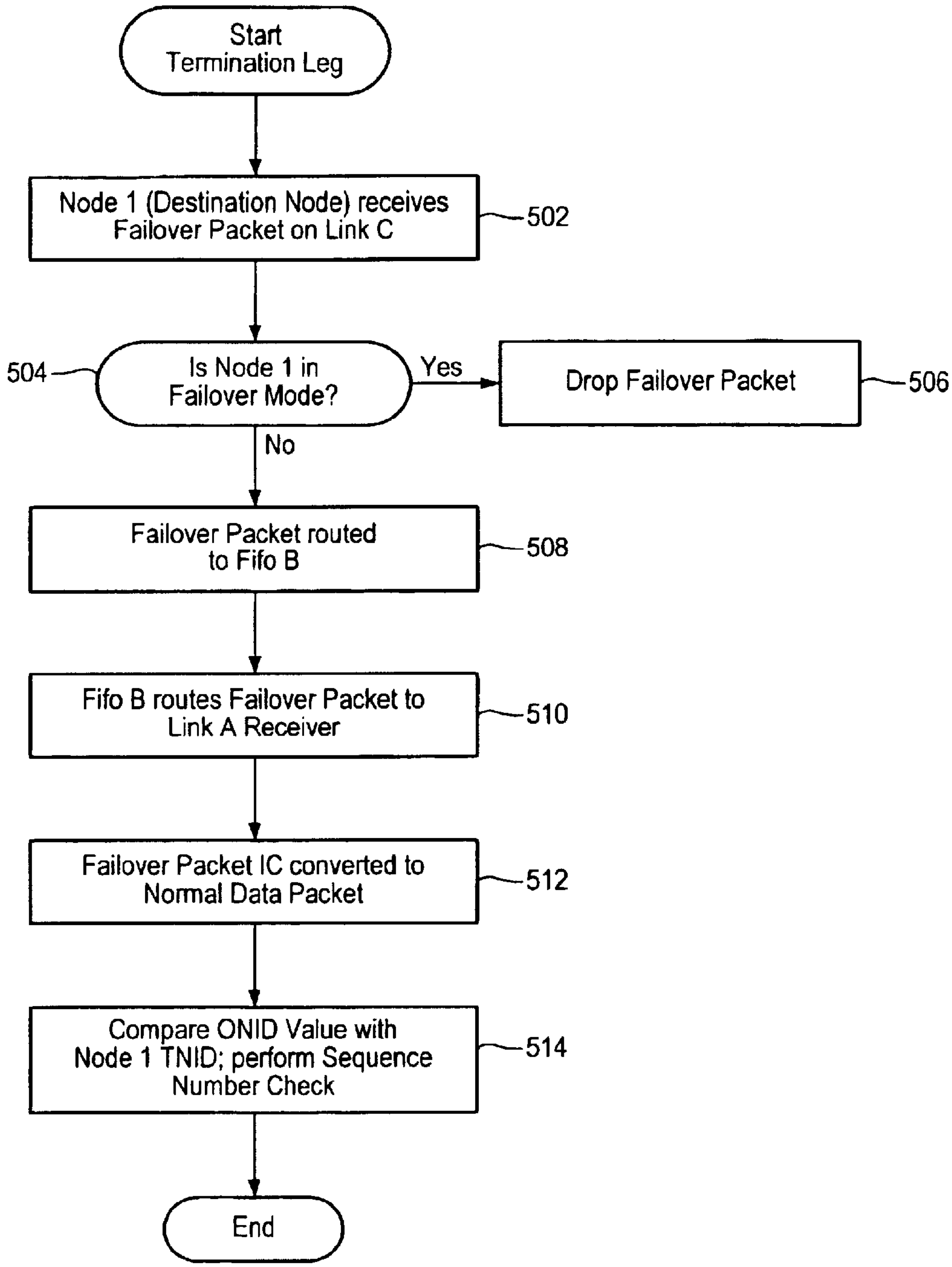
FIG. 5 is a flow diagram of a process of a termination leg of a failover process in accordance with one embodiment of the present invention.

FIG. 5 is a flow diagram of a process of a termination leg of a failover process in accordance with one embodiment of the present invention. At step 502 the terminate node, Node 1, receives the FOP on its Link C receiver and stores it in its failover buffer. For a node to be a termination node for a failover packet, as opposed to a multihop node, the node must be in failover mode. This is determined at step 504. Failover packets will be accepted at the terminate leg node only when the node is in failover mode. In the described embodiment, if the node is not in failover mode, the FOP will be dropped at step 506 if the packet is destined to this node. If it is in failover mode, control goes to step 508.

At step 508 the FOP is routed to FIFO B from the failover buffer. As mentioned above, FIFO B only receives input from receivers. At step 510, when the packet arrives at the head of FIFO B. it is sent to the receiver for failed Link A, the interconnect that had originally failed. At step 512 the FOP is converted by resetting the failover_pkt bit in the packet. In the described embodiment, if the receiver is already in failover mode, it expects to receive failover packets (and not normal packets) which has proper CRC values and sequence numbers. At this stage the packet is processed as if it were received from the sync buffer. At step 514 the original ONID value in the CRC is checked with the node's TNID and sequence number. Packets failing the CRC check are dropped and treated as transmission errors. Those passing are placed in the appropriate buffer.

Figure 6:
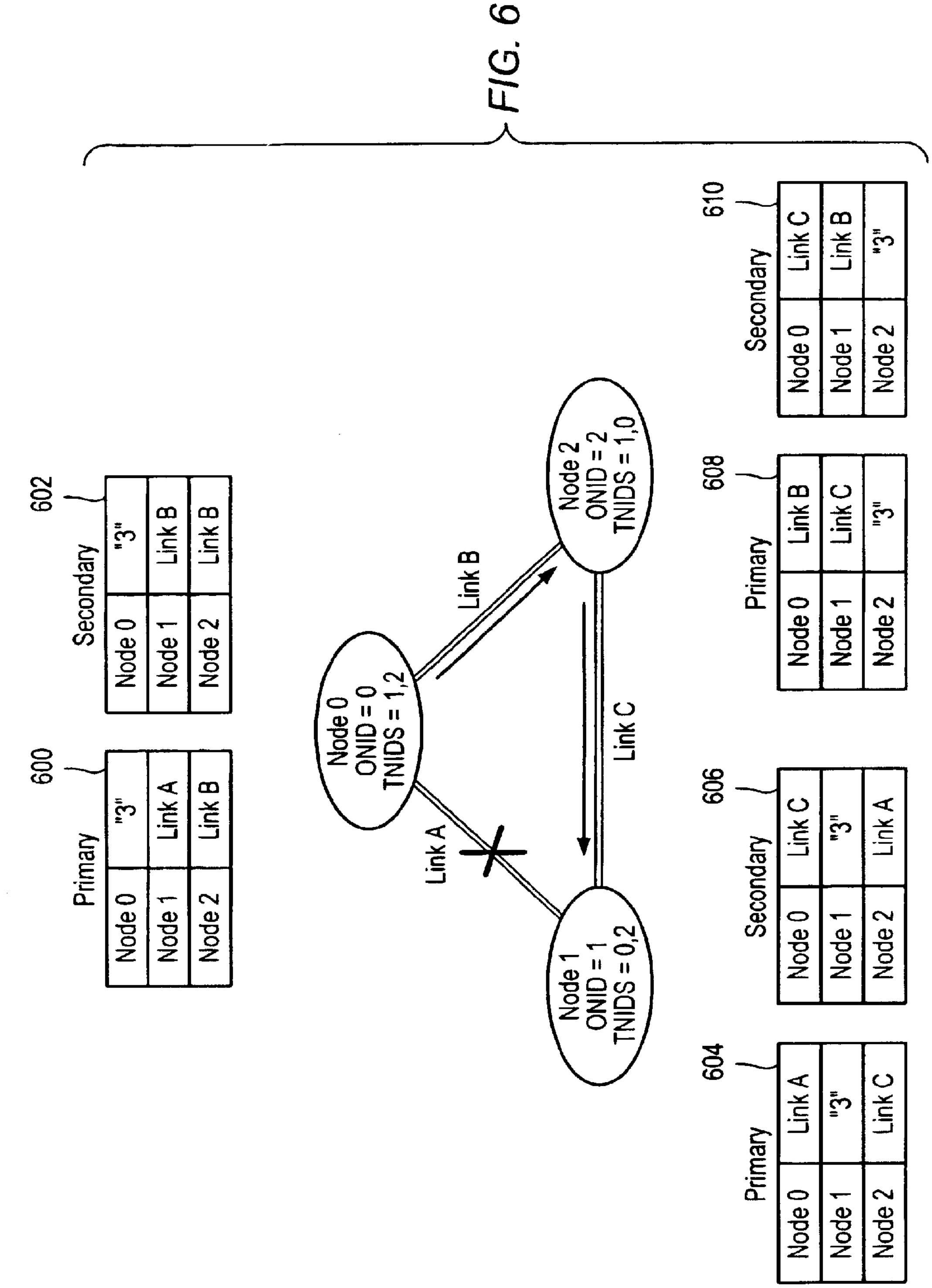
FIG. 6 shows the structure of failover route tables in accordance with one embodiment of the present invention.

FIG. 6 shows the structure of failover route tables in accordance with one embodiment of the present invention. Each node has a primary and secondary route table. Each table is made up of n rows and two columns, where n is the number of nodes in the network (or a realm of the network). Referring to the above example, the failover route tables for Nodes 0, 1, and 2 are shown. Table 600 is the primary table and table 602 is the secondary table for Node 0, table 604 and 606 are the primary and secondary routing tables for Node 1, and table 608 and table 610 are the primary and secondary routing tables for Node 2. In the described embodiment, the first column in any of the tables contains TNIDs of all the nodes. The TNID of an incoming FOP is used to index this table In the example, there is a total of three entries for three nodes in this column, including an entry for the current node. In the primary table, the second column contains the primary or "first choice" link to be used for a corresponding node. For example, for sending a packet to Node 0 from Node 1, Node 1's primary routing table instructs that for Node 0, Link A should be used. Similarly, Node 0's primary route table indicates that Link A should be used for sending data to Node 1. For sending data to Node 2, Link B should be used. The entry for the current node itself contains a specially designated value that means "local" or "no route." Such a value indicates that the local node is the target node for that FOP, or that there is no route to the destination node from the current node.

Secondary table 602, for example, is used if the link indicated in the primary route table is a failed link. Thus, originally when Node 0 was going to send a packet to Node 1, the primary route table indicated that it should use Link A. Since Link A had failed, Node 0 checked its secondary route table and determined that the alternative link to get the packet to Node 1 is Link B which gets the packet to Node 2 first (although the fact that it is using Node 2 is irrelevant to Node 0). Once at Node 2, its routing tables are used in the same manner. Since Link C had not failed, it did not need to search its secondary table. This is done for as many multihop nodes as needed to ensure that the packet reaches its originally intended termination node. Regardless of how the failover routing is configured (a failover path can have any number of hops) there will always be a case where the primary route table will point to the link on which the packet arrives for at least one failing link case.

Figure 7:
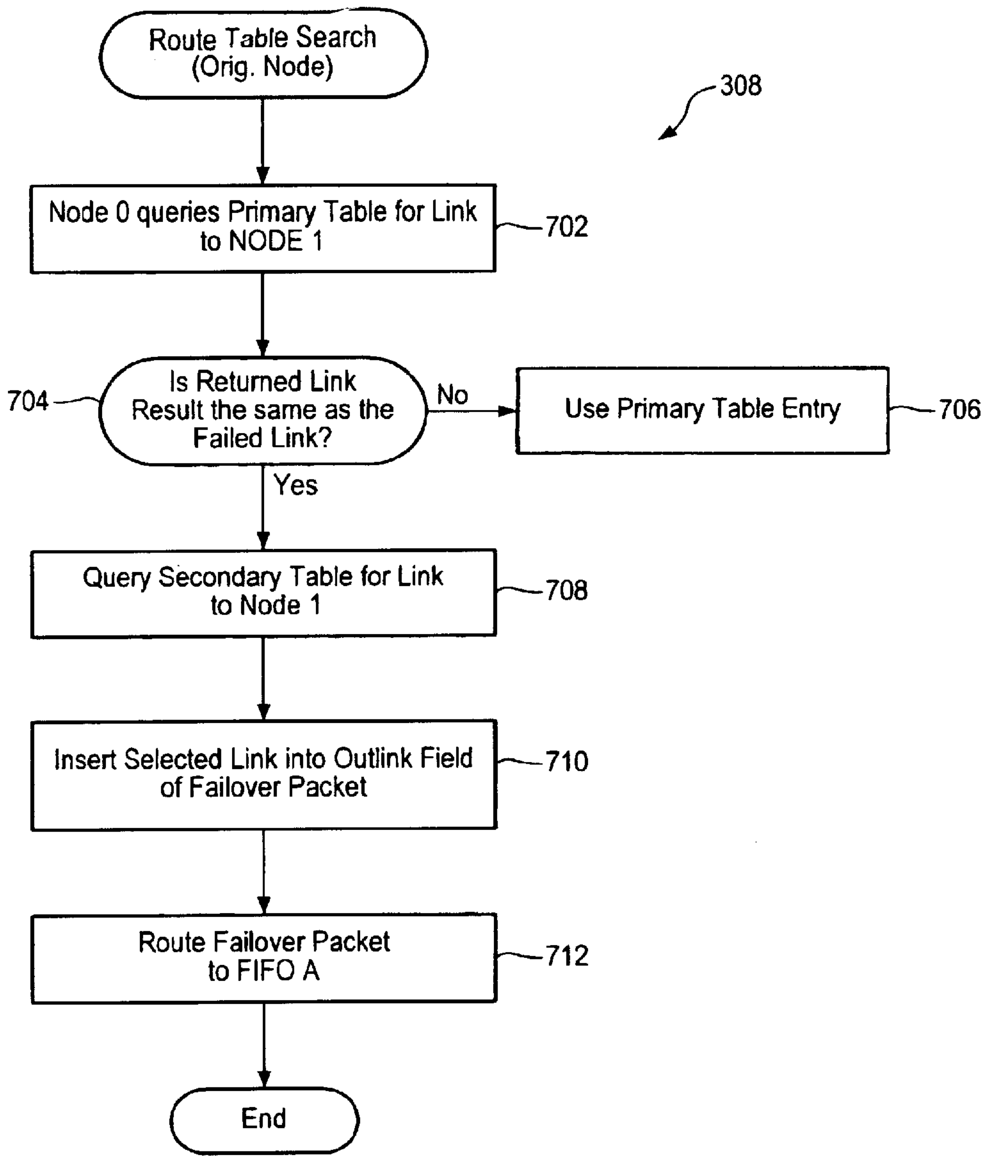
FIG. 7 is a flow diagram of a process of checking the failover routing tables at the originating node when an interconnect link has failed in accordance with one embodiment of the present invention.

FIG. 7 is a flow diagram of a process of checking the failover routing tables at the originating node when an interconnect link has failed in accordance with one embodiment of the present invention. It describes in greater detail step 308 of FIG. 3B. At step 702 Node 0 queries its primary routing table for sending the packet to Node 1. At step 704 the returned result, Link A, is compared to the failed link. If the two are not the same, control goes to step 706 where the returned link is used and is inserted into the outlink field of the data packet and the normal routing process is used. If the returned link is the same as the failed link, control goes to step 708 where the secondary routing table is queried for Node 1. At step 710 the returned result is inserted into the outlink field of the FOP. The packet is then routed to FIFO A at step 710 and the process continues with step 310 of FIG. 3B.

Figure 8:
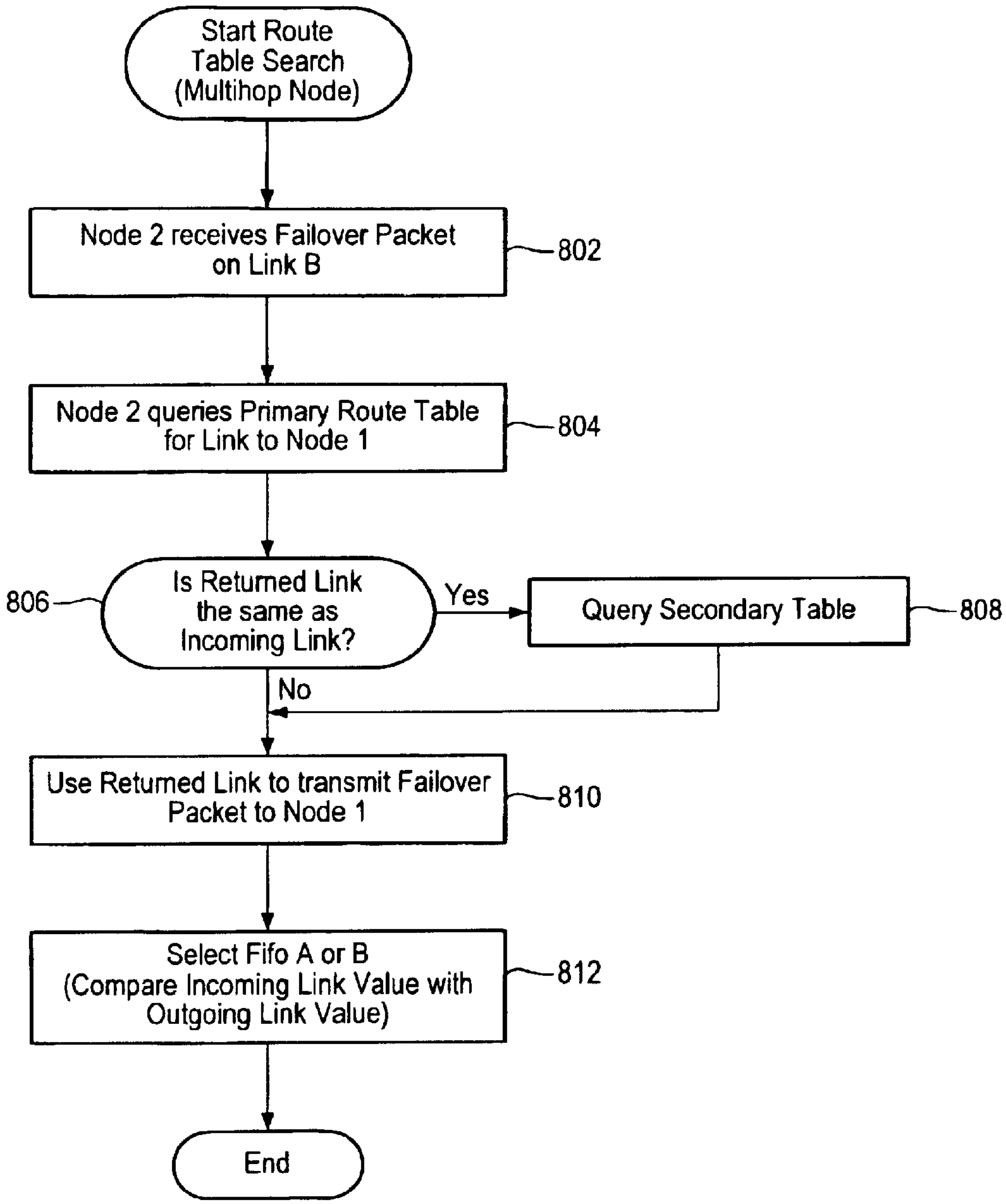
FIG. 8 is a flow diagram of a process of checking the failover routing tables at a multihop node when an interconnect link has failed in accordance with one embodiment of the present invention.

FIG. 8 is a flow diagram of a process of checking the failover routing tables at a multihop node when an interconnect link has failed in accordance with one embodiment of the present invention. It describes in greater detail steps 408 and 410 of FIG. 4 where the node determines on which alternative link to forward the FOP and which FIFO to use. At step 802 Node 2, the multihop node in the above illustration, receives an FOP on Link B. At step 804, Node 2 checks its primary routing table using the TNID for Node 1 as an index. In the case of a multihop node which does not have any failed links, the secondary routing table will be searched if the primary table returns the incoming link. In this case, Link C would be returned. This check is done at step 806 where the returned link from the primary table is compared to the link on which the FOP arrived. In this case Link B, the incoming link, is compared to Link C. If the two are the same, control goes to step 808 where the secondary routing table is searched again using the TNID for Node 1 as an index.

Once an outgoing link has been determined whether from the primary or secondary table, that link is used to forward the FOP. In this case Link C will be used to send the packet to its destination. Before the packet can be sent out, it will first make its way through the failover logic and get to the appropriate transmitter. At step 812 the node determines which FIFO to use. In the case of a multihop node, where a packet is routed internally from a receiver to a transmitter, either FIFO A or B can be used to route the FOP. In the described embodiment, the node chooses a FIFO by comparing physical port numbers or identifiers of the incoming and outgoing links. For example, if the port number for Link B is greater than the port number for Link C, then the FOP is routed to FIFO A, if not, it is routed to FIFO B. The reverse of this rule can also be used, as long as the rule is applied consistently for all FOPs. Once the packet goes through one of the FIFOs, it is sent to the appropriate transmitter for the selected outgoing link at step 814 and is transmitted to its destination node (or to another multihop node).

In addition to keeping networks reliable by providing automatic link failover when a link fails so that data packets will reach their destinations, more generally, networks must operate and be managed efficiently. For example, one aspect of increasing overall performance of a network is maximizing the use of available bandwidth for carrying actual user data as opposed to data needed for network maintainance and other purposes. Another aspect of increasing efficiency is to increase the throughput of packets from receivers to transmitters via a crossbar or switch in a node. In other preferred embodiments, the crossbar or switch can be outside a particular node. As described above, when a packet is received at a node, it is placed in a single receiver buffer.

Crossbar efficiency is not maximized when only a single set of receive buffers are used for the links. Thus, in the described embodiment, a single receiver buffer is split into two separate receiver buffers. As is described below, it is important to keep the order of the packets in each receiver buffer in the correct order, but that the order of packts between the two receiver buffers need not be kept in the same order. Generally, a crossbar essentially allows all receivers to communicate with all transmitters with the exception that packets to receiver are not sent to the receiver's corresponding transmitter. This prevents packets from looping around back to the same receiver. The problem that arises when using a single receiver buffer is that packets wanting to go to different transmitters are blocked until the packet in front of them are routed first. For example, one packet needs to go out to transmitter 0 and another packet behind it in a queue in the same buffer needs to go to transmitter 1. In one clock cycle, the packet for Xmit 0 gets out, and in the next clock cycle, the packet behind it for Xmit 1 gets out. However, this packet had to wait one clock cycle before it could be sent out to a different transmitter which may have been idle waiting for it. In other words, the second packet was blocked from getting out because the receiver has only one buffer. This blocking problem becomes exponentially worse as the number of receivers and transmitters increases since it is more likely that packets in a receiver buffer will be destined for different transmitters.

Figure 9:
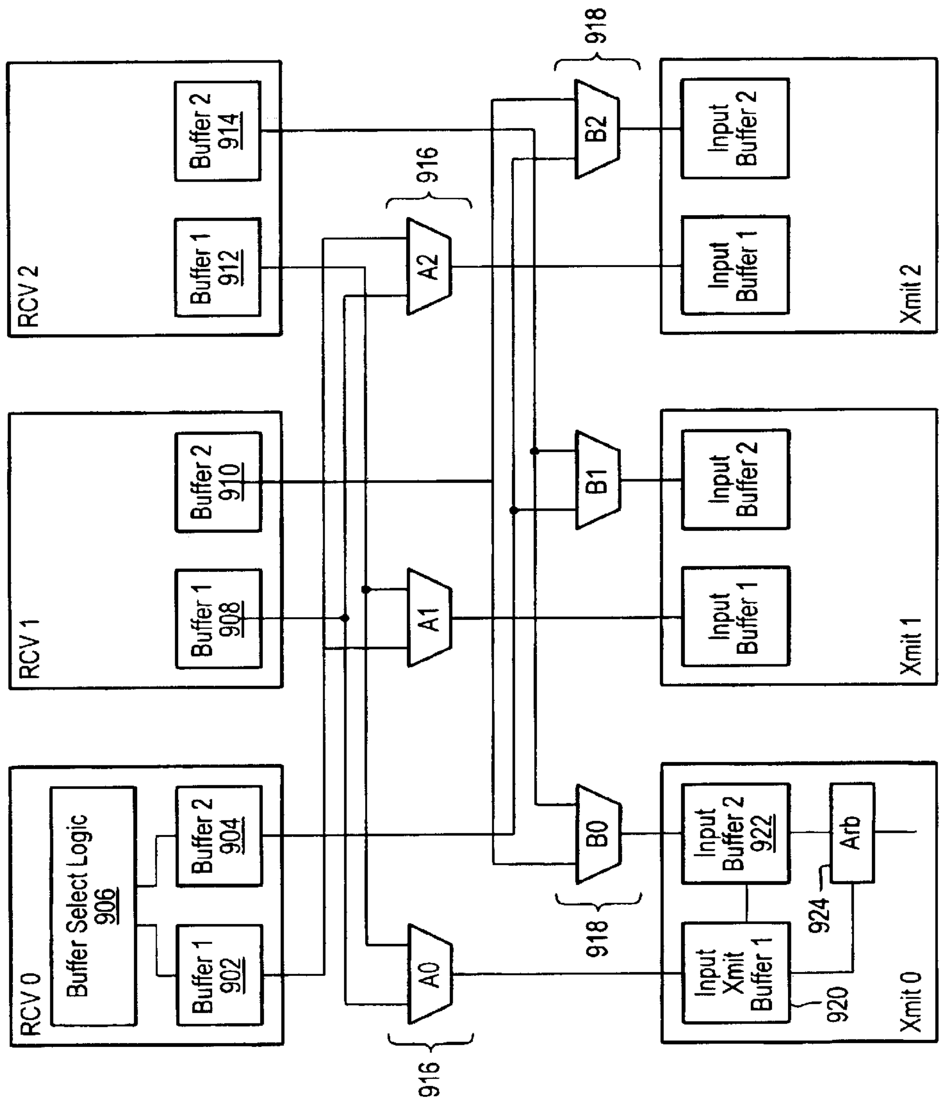
FIG. 9 is a block diagram of a dual crossbar for routing packets from pairs of receiver buffers in accordance with one embodiment of the present invention.

FIG. 9 is a block diagram of a dual crossbar for routing packets from pairs of receiver buffers in accordance with one embodiment of the present invention. Shown in FIG. 9 are three receivers, RCV0, RCV 1, and RCV2. Each receiver has two buffers for holding the incoming data traffic, which is split into each buffer as described below. RCV0 has two buffers, buffer1 902 and buffer2 904, and a buffer select logic unit 906 which essentially splits the incoming traffic to one of the two buffers based on a predetermined criteria. The other components normally found in a receiver but not relevant to the dual crossbar concept are not shown in FIG. 9. Each of the other two or more receivers also have two receiver buffers, shown as buffers 908 and 910 in RCV 1 and buffers 912 and 914 in RCV 2.

Each packet has information that can be used to categorize a packet that is used by buffer select logic 906. For example, an address, such as an address for Node 2 or Node 1, contained in the packet can be used to categorize the packet. In the described embodiment, it is important to maintain order over a set of addresses or on an address-to-address basis. As mentioned, one way of increasing the efficiency of routing packets through a node is to have a second receiver buffer (e.g., buffers 904, 910 and 914) for each receiver and a second crossbar in the node. FIG. 9 has shows two crossbars as two series of MUXs (three MUXs in each series): crossbar 916 and crossbar 918. MUXs labeled A are comprise crossbar 916 and MUXs labeled B are in crossbar 918.

In the described embodiment, a stripe bit in the address can be used to categorize a packet. A particular criteria, such as all packets for a particular address, or having an odd address, will have a stripe bit set, and otherwise will not have its stripe bit set. For example, all packets whose destination's address is odd will have a predetermined bit set to one and if the address is even it will have the bit set to zero. When the packet is received, either at a hop node or a destination node, the receiver will examine the bit and use it to split the traffic. It will sort the packet and place it in one of its two buffers.

Each buffer will send its packets to one of the dual crossbars 916 or 918. Following the same example, one crossbar will get all odd-address packets and the other will process all even-addressed packets. In other preferred embodiments, other criteria, determined using empirical data for a particular network that shows an even distribution, can be used to split the packet traffic to the two different buffers. In any case, a stripe bit is set in the data packet when transmitted based on this criteria and is sorted by a receiver at the far-end node. In the described embodiment, a receiver is not enabled to send a packet back to that receiver's corresponding transmitter, thereby allowing the packet to loop around to the same node. Thus, the connection lines from buffer1 902 in RCV0 go out to MUX A1 and MUX A2, and not to MUX A0 (which goes to XMIT0). All buffer1's in the receivers use crossbar 916 in the figure. They could have just as well used crossbar 918 (the B MUXs). Similarly, the connection lines from buffer1 908 in RCV1 go out to MUX A0 and MUX A2, and not MUX A1, which goes to XMIT1. In another example, buffer2 914 in RCV2 has connection lines going out to MUX B0 and MUX B1, but not to MUX B0. However, more generally a crossbar allows data packets to go through to the same transmitter thereby allowing a data packet to loop around to the same node.

A transmitter can receive packets from either crossbar so long as the order of packets within a stripe is maintained. That is, all packets with a stripe bit of 1, for example, are in the correct order when being routed through the crossbars and to the transmitters. A transmitter has two input buffers, for example, buffer1 920 and buffer2 922. Buffer1 920 (as well as the other buffer1s in XMIT1 and XMIT2) receives input from crossbar 916 (the A MUXs) and buffer2 922 receives input from crossbar 918 (as well as the other buffer2s in XMIT1 and XMIT2). When the transmitter gets packets from crossbar 916 and crossbar 918, it decides using an arbitrator 924 which packet will be sent out on the link. The other transmitters have the same type of arbitrator (not shown). With this method, there is the potential to move two packets or flits from a receiver to a transmitter with every clock cycle which greatly reduces the blocking problem experienced by receivers presently in use. As mentioned, it is necessary that there be a random or, preferably, even distribution of packets going to both receiver buffers and thus through the dual crossbars for the existing blocking problem at a single receiver buffer to be alleviated.

Figure 10:
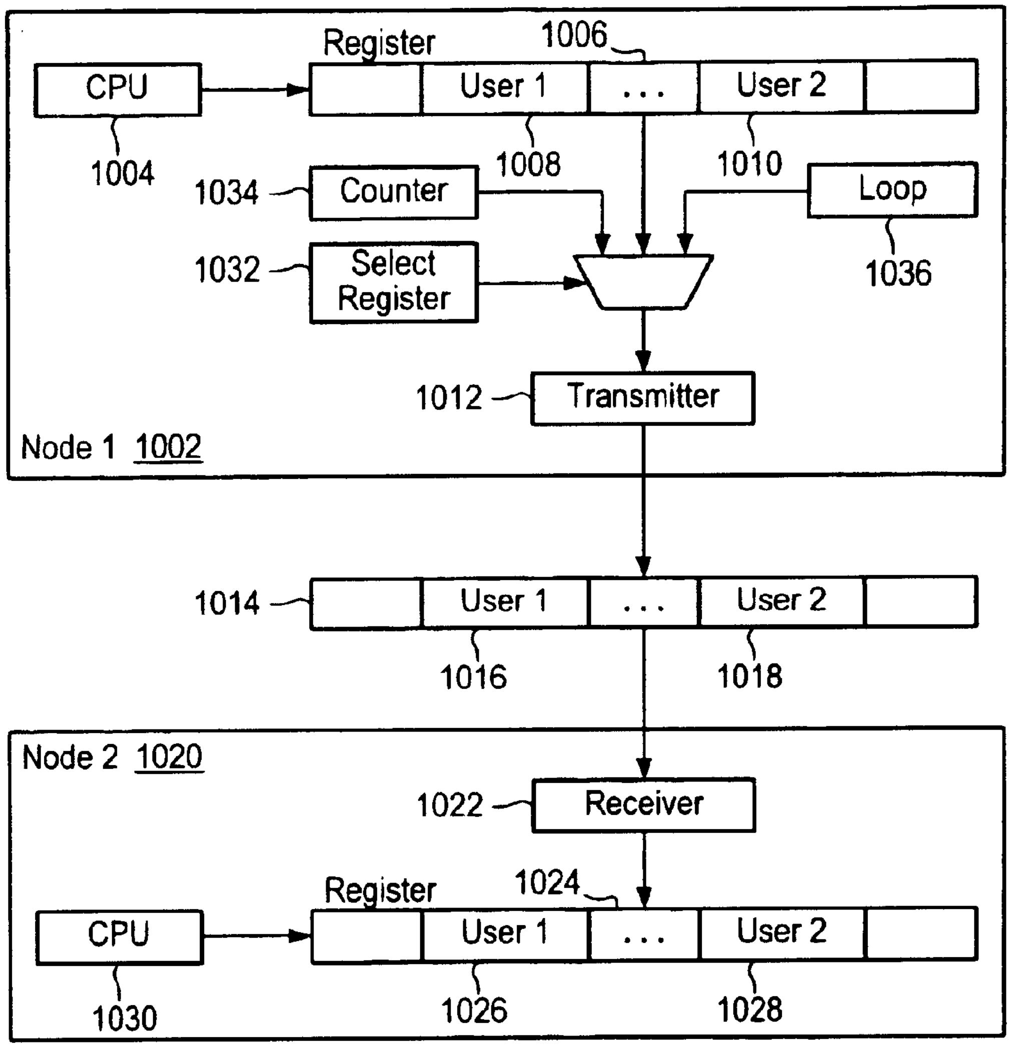
FIG. 10 is a block diagram of the registers, an administrative data packet, and the user fields in accordance with one embodiment of the present invention.

Another feature useful in improving the management of the links and can also be used for increasing efficient use of the interconnects is a user field in a register and a corresponding user field in an administrative packet. The user fields can be used by upper-level clients and by the network manager to communicate using the interconnects between nodes at a low level without having to use a high-level protocol. It can be used for link administration and allows nodes to communicate before a link is used to transmit normal user data. FIG. 10 is a block diagram of the registers, an administrative data packet, and the user fields in accordance with one embodiment of the present invention. It shows a first node 1002, Node 1, having a CPU 1004, and a register 1006. Register 1006, which can be an expansion card, has two user field registers, user 1 field 1008 and user 2 field 1010. The contents of these user fields are sent out via a transmitter 1012 in an administrative packet 1014.

In the described embodiment, administrative packet 1014 has two user fields, user field 1016 and user field 1018, which can receive content from registers 1008 and 1010 or from other sources. The packet is received at a node 1020 which has a receiver 1022 and a similar register 1024. Register 1024 also has a user field 1026 and a user field 1028. Both these fields can be written to by a CPU 1030.

In a preferred embodiment, a register 1006 contains user field 1 and user field 2 that are intended for user-level communication between the near and far end of a link. The user fields can be used to aid in the system configuration and link management process. In a preferred embodiment, user field 1008 is used for communication of user data and user field 1006 is used for control or (e.g., is data in user field 1 valid, etc.) or for hand-shaking. This low level signalling mechanism could also be used to implement software broadcasts and barriers. CPU 1004 sends instructions to write content to user field 1006 or user field 1008. The data is then stored in corresponding fields in an administration packet 1014 in user field 1016 and user field 1018. An administration packet can be sent out, for example, at every 100 clock cycles. In the described embodiment, user field 1 in the register and in the packet is 16 bits and user field 2 is two bits in length. In other preferred embodiments, the length of the fields can vary to suit the needs of the data network. The administration packet is then sent to the the far end node, Node 2, where the data in the user fields is moved to the corresponding user field 1 and user field 2 registers. The CPU at the far end node can read the register to get the information and perform actions accordingly, for example bringing down a link or immediately returning the value to the near end node, a specific function described below.

A typical problem that occurrs with packets in an interconnect system is that they get lost or dropped. A transmitter will continue sending a packet every n clock cycles until a receiver acknowledges that is was received. The transmitter will set a timer and will expect to receive a short message saying that the receiver got the packet within a certain time frame. This time frame is approximately the round-trip time a packet needs to return to the near end node. A time interval longer than the estimated round-trip time, and it is assumed the packet is lost. If the estimated round-trip time is not accurate, for example, the time is too long, bandwidth on that link is being wasted. That is, it could be used but is not since the transmitter is waiting for an acknowledgment to determine whether to re-send the packet. Thus, an accurate measure of the round-trip time between nodes can be an important calibration that should be determined before the link is used to send data. The transmitter's re-transmission time should be tied to the measured round-trip time as accurately as possible.

The user fields described in FIG. 10 can be used to perform link calibration to obtain an accurate measurement of a link's round-trip time. In the described embodiment and referring to user field 1016 and user field 1018 in the administration packet, a node can be insert one of three data items in this field. As described above, user field 1, numbered as 1016, can contain the contents of user field 1 register. In this case, the contents can be a specific, one-time message, from an upper-level client or network manager; essentially any message that needs to be sent to the far end node. However, user field 1016 can also be used to hold a counter or loop back value for measuring a round-trip link time.

Figure 11A:
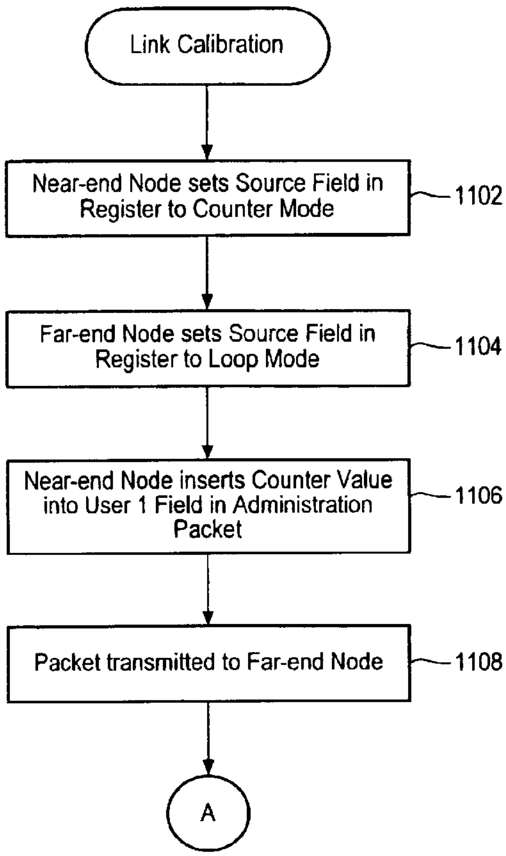
FIG. 11 is a flow diagram of a process of using user fields in an administration packet for link calibration in accordance with one embodiment of the present invention.
Figure 11B:
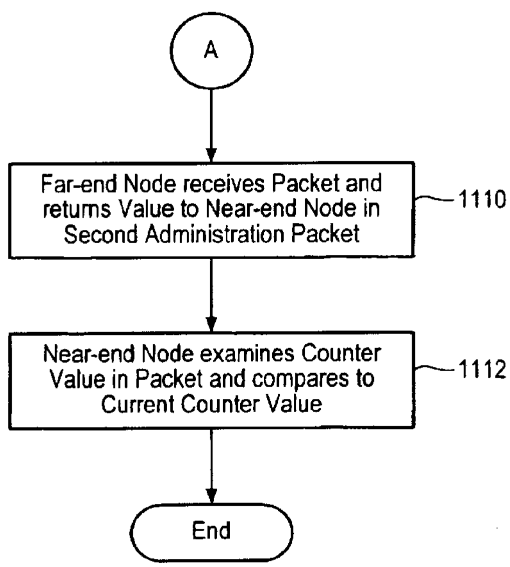

FIGS. 11A and 11B are flow diagrams of a process of using user fields in an administration packet for link calibration in accordance with one embodiment of the present invention. At step 1102 the near-end node sets the user field to counter mode. Similarly, at step 1104 the far-end node sets its user field to loop mode. These steps are performed only when the nodes are about to measure the round-trip time on the link between two nodes. At step 1106 the near-end node inserts a counter value into the user 1 field in the administration packet. The counter value is directly related to a clock cycle value. The packe is then transmitted to the far-end node.

The far-end node receives the administration packet at step 1110 and returns the counter value in user 1 field to the near-end node in an administration packet. The far-end node does not perform any operations on the counter value received. It simply returns the value to the near-end as quickly as possible. At step 1112 the near-end node examines the counter value in the packet. In the described embodiment, it compares the counter value to the current counter value, such as the current clock cycle, and takes the difference between the two values as the round-trip time for that particular link. In other preferred embodiments, the near-end node can perform other functions with the returned counter value to determine the round-trip time or other appropriate measurement for calibrating the link.

Another requirement that consumes bandwidth in a packet is framing data. As is known in the field, framing data is necessary in each flit in a data packet and is used in the event flits are lost or get out of order at a receiver. They also tell the receiver the length of a data packet in terms of number of flits. Typically, an entire line in a fiber ribbon is devoted to framing information. A transition from a series of zero's to one's can be used as framing information indicating when a new flit begins. A data packet is typically one flit, two flits, or four flits in length, where a flit is the amount of data sent over a serial link in one clock cycle. In the described embodiment, a flit is 88 bits in length and is sent over a parallel fiber-optic link in 11 eight-bit units of data.

Figure 12:
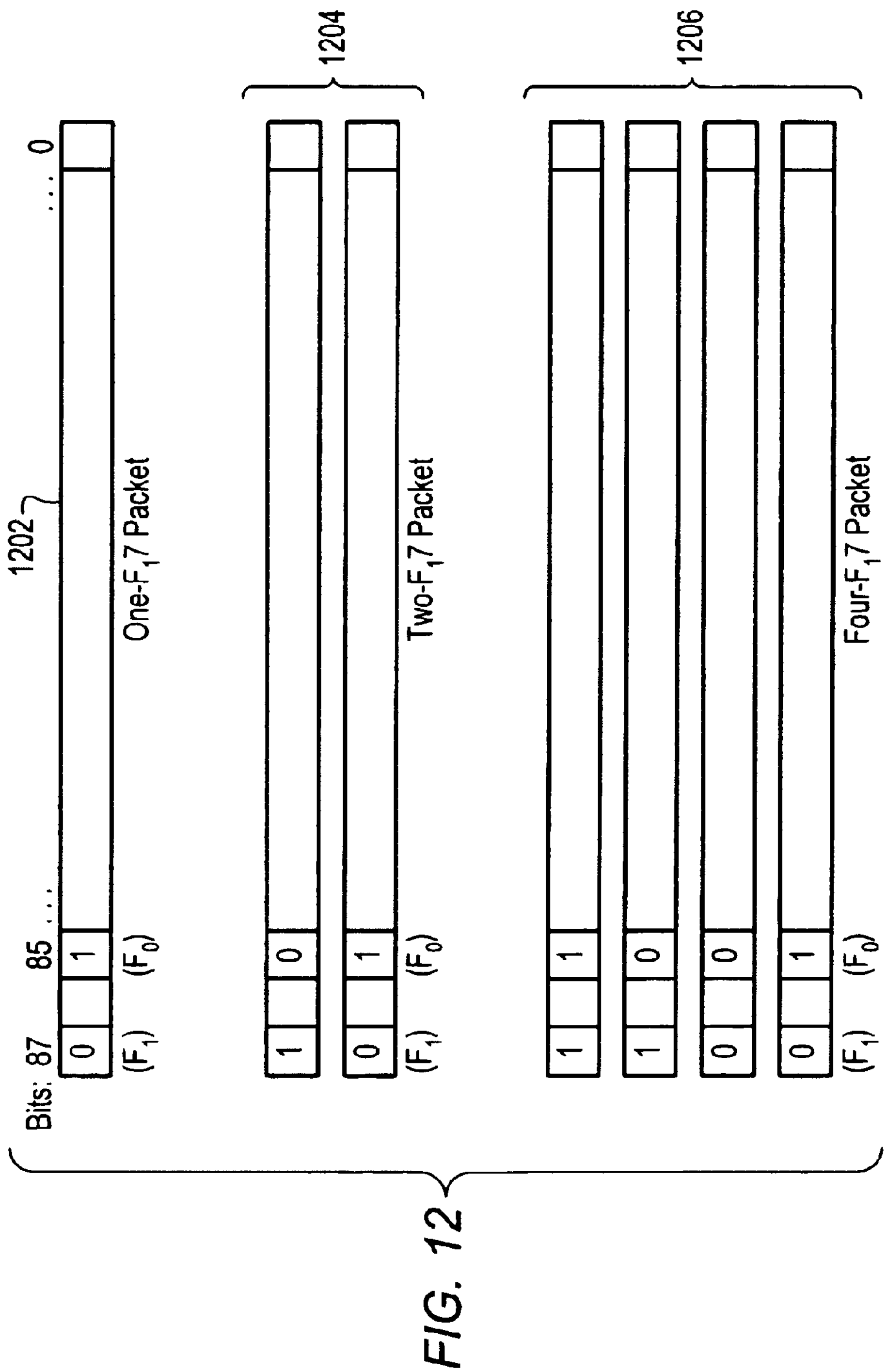
FIG. 12 is a block diagram showing framing data for various size data packets in accordance with one embodiment of the present invention.

In the present invention, framing data consumes only two bits for each flit. A one-flit packet needs only two bits, a two-flit packet needs a total of four bits, and a four-flit packet needs a total of eight bits to convey framing data sufficient for getting a data packet back in order in the event flits are lost or misordered. Thus, for each flit, 86 bits are available for data (although, not all 86 may necessarily be used for payload). FIG. 12 is a block diagram showing framing data for various size data packets in accordance with one embodiment of the present invention. The framing bits for each flit are represented by F-sub1 and F-sub0, contained in bit 87 and 85, respectively. When a new packet is received, the framing bits are examined to determine the length of the packet in terms of flits. In the present invention, a one-flit packet, such as packet 1202, is represented by 0,1; that is, a 1 in bit 87 and a 0 in bit 85. The sequence of 0 in F-sub 1 and 1 in F-sub0, indicates either the end of a packet or the beginning (and end) of a one-flit packet. Thus, if the receiver reads a 0 and 1 in bits 87 and 85, it knows it has received a one-flit packet or has reached the end of a multi-flit data packet.

The bits for a two-flit packet, such as packet 1204, are 1,0 for the first flit followed by a 0,1 for the second flit (ie., a two followed by a one). If the receiver sees a 1,0 in the first flit, it knows immediately that the packet is a two-flit data packet and can begin decoding the data. Once the receiver knows how long a data packet is, it can begin decoding the packet. With a four-flit packet, such as packet 1206, the sequence of bits is 1,1 in the first flit, followed by 1,0, and 0,0 in the third flit, and 0,1 which indicates the end of the packet. Thus, the order is three, two, zero, and one. Once the receiver sees a 1,1 combination in bits 87 and 85, it knows that it has received a four-flit packet. If the receiver sees a 1,0 in the framing bits and then a 0,1, it knows that it has just received a two-flit packet. If it sees a 1,1, it know it has received a four-flit packet. If the receiver sees framing bits that do not follow the above rules, it knows the there is a framing error and the packet is corrupt. For example, if the receiver sees a 0,0 after a 0,1 seqeuence, it will record an error in the data packet, or if it sees a 1,1 after any sequence other than a 0,1, it knows the data packet has an error.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A node in an interconnect link system comprising:

a first buffer for receiving a first data segment passing a first criteria based on a predetermined one or more bits for the first segment;

a second buffer for receiving a second data segment passing a second criteria based on the predetermined one or more bits for the second segment;

a first crossbar for routing the first data segment from the first buffer to any of one or more transmitters; and a second crossbar for routing the second data segment from the second buffer to any of the one or more transmitters, such that the first data segment and the second data segment are routed to the one or more transmitters in one clock cycle in the node.

2. A node as recited in claim 1 further comprising a data packet having a plurality of bits, the predetermined one or more bits being a stripe bit wherein the stripe bit is used for determining the appropriate buffer to sort data segments into.

3. A node as recited in claim 1 further comprising a receiver capable of sorting a plurality of received data segments based on the predetermined one or more bits in a data segment.

4. A node as recited in claim 1 further comprising a transmitter having an arbitrator to decide which data segment to transmit.

5. A node as recited in claim 1 wherein the first buffer and the second buffer are in a receiver.

6. A method of routing received data packets through a node, the method comprising:

receiving, from an input line, data packets at a receiver in the node;

examining the data packets based on one or more categorical bits in the data packet;

sorting the data packets to a first buffer and a second buffer based on the one or more categorical bits in the data packet;

connecting the data packets from the first buffer with any of a plurality of transmitters via a first crossbar;

connecting the data packets from the second buffer with any of the plurality of transmitters via a second crossbar; and transmitting data packets routed from first buffer and the second buffer through the first and second crossbar in one clock cycle.

7. A method as recited in claim 6 wherein examining the data packet further includes determining whether a stripe bit in the data packet is zero or one.

8. A method as recited in claim 6 wherein sorting the data packet further includes routing the data packet to a first buffer if the one or more categorical bits meets a first criteria and routing the data packet to a second buffer if the one or more categorical bits meets a second criteria.

9. A method as recited in claim 8 wherein the first criteria is that one or more of the categorical bits be a zero and the second criteria is that one or more of the categorical bits be a one.

10. A method as recited in claim 6 wherein inputting the data packet to one or more crossbars further comprises routing the data packet to a transmitter.

11. A method as recited in claim 6 further comprising maintaining the order of sequential data packets passing through one of the plurality of buffers.

12. A routing node suitable for use in a network that carries data packets, the routing node having a plurality of input lines and a plurality of output lines, the node comprising:

a first receiver that receives packets from a first input line, the first receiver including a first buffer arranged to receive data packets that contain one or more selected bits that meet a first predetermined criteria, and a second buffer arranged to receive at least some of the data packets that are not directed to the first buffer;

a first crossbar arranged to connect data packets from the first buffer with any of a plurality of output lines; and a second crossbar arranged to connect data packets from the second buffer with any of the plurality of output lines, whereby packets received by the first input line may be transmitted to an appropriate output line through either the first or second crossbar.

13. A routing node as recited in claim 12 comprising a plurality of receivers, each receiver being arranged to receive packets from an associated input line, and wherein each receiver has associated first and second buffers, each first buffer being coupled to the first crossbar and each second buffer being coupled to the second crossbar.

14. A routing node as recited in claim 13 wherein each receiver is arranged to peek at a designated stripe bit in each data packet received by the receiver, wherein if the stripe bit is a designated value, the data packet is passed to the first data buffer.

15. A routing node as recited in claim 14 wherein if the stripe data packet is passed to the second data buffer.

* * * * *

UNITED STATES PATENT AND TRADEMARK OFFICE

CERTIFICATE OF CORRECTION

PATENT NO. : 6,952,419 B1
DATED : October 4, 2005
INVENTOR(S) : Cassidy et al.

It is certified that error appears in the above-identified patent and that said Letters Patent is hereby corrected as shown below:

Column 16,
Line 56, insert “bit is not the designated value,” after -- stripe --.

Signed and Sealed this

Seventeenth Day of January, 2006

JON W. DUDAS
*Director of the United States Patent and Trademark Office*